United States Patent Office 3,652,728
Patented Mar. 28, 1972

3,652,728
CHLORINATED ETHYLENE POLYMER COMPOSITIONS FOR ELECTRICAL INSULATION
Clement J. Cornay, Lafayette, and Allen R. Guy and Warren L. Young, Baton Rouge, La., assignors to The Dow Chemical Company, Midland, Mich.
No Drawing. Continuation-in-part of application Ser. No. 689,259, Dec. 11, 1967. This application Feb. 9, 1970, Ser. No. 10,001
Int. Cl. C08f 29/04, 29/14
U.S. Cl. 260—878 R
5 Claims

ABSTRACT OF THE DISCLOSURE

This invention is directed to compositions consisting essentially of certain inherently flexible suspension chlorinated ethylene polymers, from 1 to 10 parts by weight per 100 parts of chlorinated ethylene polymer of a cross-linkable polyfunctional monomer, from 1 to 10 parts by weight per 100 parts of chlorinated ethylene polymer of a polybutadiene having from about 20 to 25 percent of vinyl unsaturation and a molecular weight of about 2500, and a chemical curing agent for the chlorinated ethylene polymer; which compositions may be rapidly cured to form easily processable, tough, smooth, coherent, inherently flexible coverings for electrical conductors.

---

This application is a continuation-in-part of copending application, Ser. No. 689,259, filed Dec. 11, 1967 now abandoned.

Various materials have been utilized for coating and insulating electrical conductors. Among the more commonly used coatings are the conventional enamel or oleoresinous varnish-type coatings; natural and synthetic rubbers; vinyl resins; styrene resins; ethylene-propylene resins and their cross-linked derivatives; and polyethylene and chlorinated polyethylene resins and their cross-linked derivatives.

All of these coating compositions have been found to be lacking in one respect or another. For example, the enamel or varnish coatings lack adequate flexibility. The rubber coatings are not sufficiently resistant to the action of organic solvents with which wire is frequently in contact (as in refrigeration units, etc.) and also deteriorate with age and exposure to oxygen and ozone in the atmosphere. The vinyl and styrene resin coatings must be plasticized in order to provide sufficient flexibility and consequently are subject to attack by organic solvents and, even if not exposed to solvents, are subject to embrittlement resulting from plasticizer migration and/or volatilization. The ethylene-propylene polymers and their cross-linked derivatives lack necessary flame-resistance without the addition of special additives and often have insufficient aging and processability characteristics as well as low tensile strength. Thermoplastic polyethylene coatings lack the required dimensional stability at voltage overload conditions, are not sufficiently flame-resistant without the presence of special additives and often lack desired flexibility. Further, coatings prepared from cross-linked polyethylenes, although generally having improved high temperature properties, as compared to the non-cross-linked polyethylenes, are also insufficiently flame-resistant and flexible.

Coating prepared from cross-linked chlorinated ethylene polymers, particularly those essentially linear chlorinated ethylene polymers having a molecular weight of from about 20,000 to 200,000, a chlorine content of from about 25 to 50 percent, a relative crystallinity of less than about 10 percent, a tensile strength of greater than about 1000 p.s.i. and 100 percent modulus of less than about 300 p.s.i., are particularly well suited for preparing protective coverings having excellent electrical properties and resistance to solvents and aging.

Further, such chlorinated ethylene polymers can be readily processed at moderate temperatures so that chemical cross-linking agents having curing rates which are sufficiently rapid for commercial requirements may be advantageously used without undesirable scorching or premature cross-linking of the polymer during compounding or deposition, e.g., by extrusion, of the composition. Exemplary of preferred cross-linking agents are the peroxides and particularly the tertiary peroxides having at least one unit of the structure

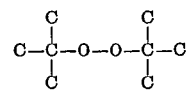

such as di-alpha-cumyl peroxide and the like as disclosed in U.S. Pat. No. 3,171,866; as well as peroxides from the class of bis(tert. alkyl peroxy)-alkanes as disclosed in U.S. Pat. No. 2,916,481. Such compositions suffer, however, from insufficient tensile strength and when admixed with conventionally used cross-linkable polyfunctional monomers in amounts required to significantly increase such tensile strength become difficultly processable at low temperatures, i.e., temperatures in the order of 250° F.

It is accordingly, the principal object of this invention to provide compositions for the coating of electrical conductors, based on the inherently flexible, aqueous suspension chlorinated ethylene polymers which have enhanced tensile strength without loss in low temperature processability.

The above and related objects are attained by preparing compositions consisting essentially of (1) an essentially linear chlorinated ethylene polymer having a molecular weight of from about 20,000 to 200,00, a chlorine content of from about 25 to 50 percent, a relative crystallinity of less than about 10 percent, a tensile strength of greater than about 1000 p.s.i. and 100 percent modulus of less than about 300 p.s.i., in admixture with (2) from about 1 to 10 parts per hundred parts of chlorinated ethylene polymer of a cross-linkable difunctional monomer, (3) from about 1 to 10 parts per 100 parts of chlorinated ethylene polymer of a polybutadiene having a molecular weight of about 2500 and a vinyl unsaturation of from about 20 to 25 percent, and (4) a chemical curing agent for such composition.

The chlorinated ethylene polymers used in the compositions of the present invention are obtained by practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers. More specifically, such chlorinated ethylene polymers are prepared by chlorination of the described polymers and interpolymers of ethylene in aqueous suspension wherein such polymer is first chlorinated at a temperature below its agglomeration temperature for a period sufficient to provide a chlorine content of from about 2 to 23 percent chlorine, based on the total weight of the polymer; followed by a sequential suspension chlorination of such polymer, in a particulate form, at a temperature above the agglomeration temperature but at least about 2° C. below the crystalline melting point of the polymer.

Preferably, the ethylene polymers to be chlorinated are those distinct species and varieties of essentially linear and unbranched, highly porous polymers of small particle size, containing at least about 90 mole percent ethylene in the polymer molecule with the remainder being one or more ethylenically unsaturated comonomers, such polymers being prepared under the influence of catalyst systems comprising admixtures of strong reducing agents such as triethyl aluminum and compounds of Groups IV–B, V–B and VI–B metals of the Periodic System, such as titanium tetrachloride, and the like, and having a molecular weight less than about 1,000,000 and preferably between about 20,000 and 200,000.

Exemplary of useful ethylenically unsaturated comonomers are the non-aromatic hydrocarbon olefins having 3 or more carbon atoms such as propylene, butene-1 and butene-2, and 1,7-octadiene and the like; cycloaliphatic olefins such as cyclopentene and 1,5-cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

The inert liquid which is employed to suspend the finely divided polymer in the suspension chlorinating procedure may be any liquid which is inert to the polymer and is not affected to an appreciable extent by chlorine, or which, while wetting the polymer will not have an appreciable solvent effect on it. While water may be employed with especial advantage as an inert suspending liquid for the ethylene polymer to be chlorinated, the polymer may also be suspended in other inert liquids.

A variety of wetting agent, including sulfonates, sulfates, polyphosphates and other types of ionic and non-ionic surfactant materials may be suitably employed, if desired, to assist the inert suspending liquid, particularly when it is water, to wet the polymer. Such materials as sodium lauryl sulfate and alkyl aryl polyether alcohols are illustrative of specific wetting agents that may be utilized. The employment of a wetting agent facilitates the suspension and distribution of the polymer during chlorination. In some cases, however, it may be unnecessary to use wetting agents, especially when a freshly prepared polymer is employed that is undried after its preparation or when efficient agitation is available for producing and maintaining the polymer slurry.

It is furthermore possible and has proved of special advantage to carry out the chlorination in the presence of inert substances of inorganic or organic chemical nature which are such that they have an affinity for adsorption onto the surfaces of the ethylene polymer during chlorination so that they may function as barriers to inhibit polymer particle agglomeration. Exemplary of useful inert materials are: magnesium silicate, carbon black, and titanium dioxide and the like. Such materials may be employed for the desired purpose without significantly detracting from the highly desirable elastomeric properties of the polymer.

The chlorinated ethylene polymers used in the present invention possess a desirable balance between physical strength, e.g., tensile strength, and processability. For example, such chlorinated ethylene polymers, without deleterious amounts of extender oils, may be extruded at temperatures low enough to prevent premature curing when in the presence of chemical curing agents and still result in smooth coatings. Further the chlorinated polymers may be compounded with desired amounts and types of fillers and the like, by conventional means such as on a heated roll mill or in a Banbury mixer. More specifically, it has been found that the contemplated chlorinated ethylene polymers flux quickly using machine temperatures of from about 200 to 220° F. with little or no addition of oils or waxes, and without excessive stock temperature build up. Thus, excellent filler dispersion is obtained and, in addition, chemical cross-linking materials may be added without first cooling the admixture. The low shear characteristics of the admixture also prevent "spot" overheating which could cause premature curing. This lack of overheating precludes need for sequential addition of fillers, oils and cross-link agents, thus allowing continuous mixers to be used.

By way of comparison, resins retaining greater than about 10 percent relative crystallinity do not flux easily at temperatures between about 200 and 220° F. and tend to cause spot overheating and undesirable heat build-up because of their high internal viscosity at these temperatures. Further, these resins when extruded at low temperature in the presence of chemical cross-linking agents tend to undergo premature cross-linking or scorching and result in extrudates having rough surfaces.

By way of further comparison, it has been found that chlorinated ethylene polymers having an average molecular weight in excess of 1,000,000 generally require significant amounts of extender oils and/or waxes for adequate processability, which additives may render the admixture flammable and cause poor aging and low temperature flexibility properties. Further, relatively large amounts of reinforcing fillers are required to overcome physical property losses resulting from the use of extender oils with resultant deleterious effect upon the aging and electrical characteristics of the admixture. With these required high additive concentrations batch internal mixer operation is particularly difficult since the initial fluxing of the resin is carried out at low volume loading of the mixer, or in a "split" load, the latter being time consuming. "Hot Spot" conditions caused by initial high shear conditions preclude the use of continuous mixers.

The chlorinated ethylene polymer constituent of the compositions of the present invention can be cured using any suitable chemical reactant or by the action of rays which are rich in energy, for example, ultraviolet light or radioactive rays. As previously discussed however, the contemplated chlorinated ethylene polymer can be readily processed at moderate temperatures so that chemical cross-linking agents having curing rates which are sufficiently rapid for commercial requirements may be advantageously used without undesirable scorching or premature cross-linking of the polymer during compounding or deposition, e.g., by extrusion, of the composition. Exemplary of preferred cross-linking agents are the peroxides and particularly the tertiary peroxides having at least one unit of the structure

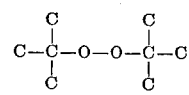

such as di-alpha cumyl peroxide and the like as disclosed in U.S. Pat. No. 3,171,866; as well as peroxides from the class of bis(tert. alkyl peroxy)-alkanes as disclosed in U.S. Pat. No. 2,916,481. It is to be understood, however, that many other conventionally employed chemical cross-linking agents such as the di- or polyamines and the like may be used if desired. It is also possible to dehydrochlorinate in a controlled manner to a small degree using heat or chemical dehydrohalogenating agents such as amines, zinc oxide and the like, followed by utilization of the resultant unsaturation for cross-linking using conventional rubber curing systems.

Several factors determine the amount of curing agent to be used including the extent of cross-linking desired, the activity of the particular cross-linking agent, and the conditions to be employed in the cross-linking operation. Normally the amount of cross-linking agent employed will be from about 0.1 to 10 parts by weight for each 100 parts by weight of chlorinated ethylene polymer used.

It is to be understood that suitable additional materials may be blended with the chlorinated ethylene polymer or the mixture of polymer and cross-linking agent. Where desired, particularly when liquid peroxides are used, such peroxide may be adsorbed on such fillers as silicas, and silicates, aluminas, carbon blacks, calcium carbonates and the like; or such fillers may be added separately in amounts of up to about 40 parts each per hundred parts of chlorinated ethylene polymer.

The present invention further contemplates utilization of blends of chlorinated olefin polymers of varying molecular weight and/or chlorine contents (within the ranges as specified herein) as well as blends of such chlorinated olefin polymers with other polymeric materials which are compatible therewith, e.g., polyethylene, ethylene-propylene copolymers, polyvinylchloride and the like in amounts up to about 100 parts by weight per 100 parts of the chlorinated ethylene polymer.

Exemplary of the cross-linkable, difunctional monomers which are useful for enhancing the tensile strength of the compositions of the present invention are: allyl acrylate, allyl methacrylate, diallyl adipate, diallyl amine, diallyl itaconate, diallyl maleate, diallyl phthalate, divinyl benzene, ethylene glycol diacrylate, ethylene glycol dimethacrylate, triallyl amine, triallyl phosphate and vinyl methacrylate.

The polybutadiene which has been found to be unexpectedly useful for maintaining the low temperature processability of the compositions of the present invention are those polymers of butadiene having a molecular weight of about 2500 and contains between about 20 and 25 weight percent of vinyl unsaturation.

Stabilizers may also be included in the compositions to minimize decomposition by the heat of processing and by subsequent exposure of the coated conductor to climatic and environmental conditions of use. Suitable stabilizers include the organic complexes, oxides, and/or organic salts of lead, and various epoxide compounds such as the epoxidized fatty acids and oils, among others. Stabilizers are preferably used in amounts sufficient to provide between about 1 and 10 parts by weight per 100 parts of the chlorinated ethylene polymer constituent. Other conventional additives, such as epoxidized oil and non-epoxidized fatty acids and low molecular weight polymers and waxes may also be employed, if desired, in amounts of up to about 50 parts or more per 100 parts of chlorinated ethylene polymer.

In general, the invention is carried out by intimately mixing the composition ingerdients on a 2-roll rubber mill or a Banbury mixer, at the desired temperature. Thereafter, the mixture can be fabricated, molded, extruded or calendered, etc., by suitable methods.

The coating of the compositions on an electrical conductor can be carried out by several well-known methods. For example, a conductor, e.g., a wire, can be coated (insulated) by extrusion of the composition around the wire using conventional extrusion apparatus. In such extrusion the wire to be coated is fed through a heated die and the mixture of polymer and cross-linking agent and such additives as may be desirable is caused to flow through the die and around the wire with the coating on the wire then being cured by heating. Such heating is often carried out by passing the coated wire through a steam tube at a temperature of from about 300 to 425° F., each section of the coated wire being subjected to such heat for a period of from about 5 to 1200 seconds. The covering may be used as the sole covering for the conductor, thus serving as insulation and external protection, or as a sheath over some other primary insulation. Such covering may also function, in various physical forms, as a semi-conducting layer over the metallic conductor.

These compositions may also be used as an adhesive layer in a covering because of their compatibility and tendency to bond with resins of widely varying polarity, e.g., polyethylene and polyvinyl chloride. Because of colorability, these compositions may also be used as coverings where color coding is desirable or necessary.

The following examples illustrate the present invention but are not to be construed as limiting its scope. Parts and percentages are by weight unless otherwise specified.

EXAMPLE 1

Part 1.—Preparation of the chlorinated ethylene polymer

In each of a series of experiments, an aqueous slurry comprising from about 3200 to 3600 grams of water and 160 to 180 grams of a polyethylene having an essentially linear and unbranched molecular structure containing less than about 1 methyl group per 100 methylene units in its molecule; a density of about 0.96; an average molecular weight of about 67,000 and which had been prepared using a catalyst composed of triisobutyl aluminum and titanium tetrachloride; was charged to a 1½ gallon autoclave with from 6.4 to 7.2 grams of calcium chloride; from 3.2 to 3.6 g. of a platy magnesium silicate; about 0.5 cc. of ditertiary butyl peroxide; and from about 24 to 27 drops of a commercially available wetting agent. Each charge was then separately chlorinated, as a first suspension chlorination step, under about 13 to 47 p.si. (gauge) of chlorine pressure at a temperature of between about 89 and 113° C. until a chlorine content of between about 5 and 23 percent was obtained.

Following completion of such first chlorination step, each charge was further individually chlorinated in a second suspension chlorination step, under a gauge pressure of 17–35 p.s.i. (as was considered necessary to obtain an efficient rate of chlorination), at a temperature of 126° C. until a total chlorine content of between 35 and 45 percent was obtained.

For comparative purposes, a sample of the non-chlorinated polyethylene was individually placed in aqueous suspension essentially as described herein, and subsequently chlorinated in a single step to a total chlorination content of about 34 percent, at a temperature of about 115° C. This sample is hereinafter identified as comparison (A).

In yet another comparison, samples of the same non-chlorinated polyethylene were separately suspension chlorinated in two steps essentially as described herein, but wherein an excess of chlorine was introduced during the first chlorination step. These samples are hereinafter identified as comparison (B).

In still another comparative experiment, a sample of the non-chlorinated polyethylene polymer was individually placed in a reactor and separately dissolved in symmetrical 1,1,2,2-tetrachloroethane at 115 to 120° C. The reactor was flushed with nitrogen and chlorine gas passed therein, the temperature maintained at from 115 to 120° C. during the chlorination, and the reaction mixture agitated. At the end of the reaction period, the reaction mixture was poured into from 5 to 7 times its volume of methanol, which acted as an anti-solvent to precipitate the polymer. The solvent was then removed and the residue dried. This sample is hereinafter identified as comparison (C).

The following Table I summarizes the physical properties of the above-described chlorinated polymers.

The column headings of the following Tables I, II and III have the following meanings:

Percent chlorine for suspension, chlorinated materials—
    Determine by tritration of HCL in aqueous slurry
Percent chlorine for solution, chlorinated materials—Determined by titration of chloride ions using $AgNO_3$
Percent relative crystallinity—Ratio of crystalline peak areas to the sum of the amorphous plus crystalline peak area as determined by conventional X-ray diffraction techniques
Percent elongation—As per ASTM Test. No. D–142–61T
Tensile strength, p.s.i.—As per ASTM Test No. D–142–61T
Heat stability—Time in minutes for a stabilized polymer [1]

---

[1] Materials containing conventional amounts and types of vinyl resin stabilizers such as metallic mercaptides, epoxide containing compounds and/or metallic soaps and the like.

to become dark red in color while being milled on a two-roll compounding mill operating at 370° F. 100% modulus—As per ASTM Test No. D–412–62T and 220° F. The peroxide was added after fusion, followed by an additional milling period of 10 minutes at 200–220° F.

TABLE I

| Run No. | Chlorination procedure | | | | Percent relative crystal-linity | Elonga-tion, percent | Tensile strength (p.s.i.) | 100% modulus (p.s.i.) |
|---|---|---|---|---|---|---|---|---|
| | Step 1 | | Step 2 | | | | | |
| | Temp., °C. | Percent chlorine | Temp., °C. | Final percent chlorine | | | | |
| Comparison (A) (suspension): 1 | 115 | 34 | | | 34 | 26.5 | 230 | 2,170 | 2,170 |
| Comparison (B) (suspension): | | | | | | | | |
| 2 | 82–86 | 30.6 | 120 | 43.2 | 10.8 | 375 | 3,000 | 1,225 |
| 3 | 90 | 26.3 | 126 | 34 | 12 | 573 | 1,710 | 575 |
| Comparison (C) (solution): 4 | 115–120 | 37.0 | | 37.0 | 0 | 800 | 1,220 | 170 |
| This invention: | | | | | | | | |
| 5 | 94–97 | 18 | 126 | 43.2 | 0 | 500 | 1,775 | 220 |
| 6 | 89.5–95 | 23 | 126 | 45 | 0 | 500 | 1,900 | 270 |
| 7 | 101–112.5 | 20 | 126 | 35 | 6.2 | 725 | 2,000 | 275 |
| 8 | 101–102 | 5 | 126 | 45 | 0 | 400 | 1,525 | 190 |

The data of Table I clearly illustrate that the products prepared by the process of the present invention are characterized by having unexpectedly enhanced flexibility (reduced 100 percent modulus), as compared to the prior known suspension chlorinated materials designated as comparisons A and B. Further, it is apparent that the products of this invention have greater elongation at a given chlorine content than such prior known suspension chlorinated materials. It is also apparent that the products of this invention have an inherent flexibility and elongation characteristic of prior known solution chlorinated materials with an accompanying increase in tensile strength.

By way of further illustration of types of chlorinated ethylene polymers which may be used in the present invention, a 5 percent aqueous slurry of a copolymer composed of (1) about 99.3 weight percent ethylene and (2) about 0.7 weight percent butene having an essentially linear and unbranched molecular structure, except for such butene branches; a density of greater than about 0.94; a melt index of about 0.34; a relative crystallinity of about 48.1 percent; and which has been prepared by the previously referred to Ziegler process using triethyl aluminum and titanium tetrachloride; was chlorinated in two stages in suspension essentially as described herein and the chlorinated product recovered and tested as described therein.

The following Table II summarizes the physical properties of the above-described chlorinated copolymer as well as these properties of the same ethylene/butene copolymer which was chlorinated in a single step for purposes of comparison.

Component: Parts by weight
Chlorinated polyethylene _____ 100
Heat stabilizer _____ 7
Carbon black _____ 30
Clay _____ 25
40% di-alpha-cumyl peroxide on CaCO₃ carrier _____ 6
Ethylene glycol dimethacrylate _____ 0–1
Polybutadiene (Buton 150) (mol. wt. of 2500 and containing between about 20 and 25% vinyl unsaturation) _____ 0–5

Each of the formulations were removed from the mill as individual sheets having a thickness of about 100 mils and allowed to cool. Thereafter, individual 6″ x 10″ mil thick samples were prepared by pressing the sheets under about 10 tons of pressure at 320° F. for 2 minutes utilizing a 2 minute preheating of the samples at 320° F. Each sample was then cured at 400° F. under 10 tons pressure for a period of 10 minutes. The following Table III summarizes the physical properties of the above-described formulations.

The column headings of Table III have the following meanings:

Ultimately tensile, p.s.i.—As per ASTM Test No. D–412–64T

Mooney viscosity—As per ASTM Test No. D–1646–63

TABLE III

| Sample No. | Ethylene glycol dimethacrylate | Polybu-tadiene | Ultimate tensile, p.s.i. | Mooney visc. at 250° F. |
|---|---|---|---|---|
| 1 | 1 | | 2,450 | 70 |
| 2 | | 1 | 2,150 | 62 |
| 3 | | 3 | 2,150 | 53 |
| 4 | | 5 | 2,150 | 51 |
| 5 | 1 | 1 | 2,300 | 60 |
| 6 | 1 | 3 | 2,400 | 53 |
| 7 | 1 | 5 | 2,250 | 50 |

TABLE II.—CHLORINATED LINEAR ETHYLENE/BUTENE COPOLYMER

| Run No. | Chlorination procedure | | | | Percent relative crystal-linity | Heat stability, minutes | Elongation, percent | Tensile strength (p.s.i.) | 100% modulus (p.s.i.) |
|---|---|---|---|---|---|---|---|---|---|
| | Step 1 | | Step 2 | | | | | | |
| | Temp., °C. | Percent chlorine | Temp., °C. | Final percent chlorine | | | | | |
| For comparison: | | | | | | | | | |
| 9 | 86 | 32.6 | | 32.6 | 25 | 20 | 100 | 1,850 | 1,850 |
| This invention: | | | | | | | | | |
| 10 | 87 | 18.2 | 118 | 34 | 1 | 32 | 800 | 1,300 | 200 |
| 11* | 86.5 | 17.7 | 118.5 | 34.5 | 1 | | 800 | 1,500 | 200 |

* 40 grams of TiO₂ added to reaction vessel prior to chlorination.

Part 2

In each of a series of experiments, a chlorinated polyethylene essentially the same as the chlorinated polymer identified as Run No. 7 on Table I was used to prepare the following formulations. In each instance, all of the formulation ingredients, except the peroxide were premixed on a hot roll mill at a temperature between 200 and 220° F.

The data of Table III show that the formulations containing the designated amounts of ethylene glycol dimethacrylate and polybutadiene are characterized by unexpectedly good processability and tensile strength as compared to formulations containing only one of such ingredients. That such a desirable balance of properties could be obtained is unexpected and could not be predicted as the effects of each ingredient, individually, are diametrically opposed to such beneficial result.

In a series of additional experiments, individual samples of compositions 5, 6 and 7 above were sheeted off from the hot roll, ground and extruded over 14 gauge wire using a 2½ inch screw-type extruder with a cross-head wire coating die and a heated cylinder. Using a cylinder temperature of about 250° F. in the extruder, a smooth uniform coating of about 3/64 of an inch thickness was obtained in each instance. The coated wire was then cured by passing it through a steam tube at a temperature of about 400° F. and with a residence time of 90 seconds. There was no indication of scorch, i.e., premature cross-linking, in any of the coatings. The cured coatings were cooled in a water zone under the steam pressure of about 200 p.s.i.g., and transmitted through a mechanical seal and wound on a reel. There was no evidence of cracks in the coatings or separation between wire and coating. Toughness and flexibility were demonstrated by repeated flexing of the coated wires. In each case, the wire broke before the coating.

By way of comparison, similar formulations prepared and extruded as specifically dscribed herein but using the suspension chlorinated ethylene polymers identified as Comparisons A and B on Table I, were found to be more difficultly processable at the temperatures used and were characterized by evidence of scorching and premature cross-linking with resultant formation of rough, somewhat discontinuous coatings. It is believed that such undesirable results are due primarily to the excessive crystallinity of such chlorinated ethylene polymer.

By way of further comparison, similar formulations prepared and extruded as described herein but using the solution chlorinated ethylene polymer identified as Comparison C on Table I, provided smooth coherent coatings, but the cured coating was characterized by a significantly reduced tensile strength.

By way of still further comparison, formulations essentially identical to those defined herein as Sample Nos. 5, 6 and 7 but utilizing a polyisobutylene having a molecular weight of about 2500, as a replacement for the polybutadiene component, failed to provide any evidence of improvement in processability as compared to compositions without such polymeric material.

What is claimed is:

1. A curable composition comprising (1) an essentially linear chlorinated ethylene polymer containing at least about 90 mole percent of ethylene in the polymer molecule with any remainder being at least one ethylenically unsaturated monomer, said chlorinated ethylene polymer having a molecular weight of from about 20,000 to 200,000, a chlorine content of from about 25 to 50 percent, a relative crystallinity of less than about 10 percent, a tensile strength of greater than about 1000 p.s.i. and a 100 percent modulus of less than about 300 p.s.i., said chlorinated ethylene polymer being prepared by chlorination of an essentially linear ethylene polymer in aqueous suspension wherein said ethylene polymer is first chlorinated at a temperature below its agglomeration temperature for a period sufficient to provide a chlorine content of from about 2 to 23 percent chlorine based on the total weight of said ethylene polymer, followed by a sequential suspension chlorination of said ethylene polymer at a temperature above the agglomeration temperature but at least about 2° C. below the crystalline melting point of said ethylene polymer, (2) from about 0.1 to 10 parts per 100 parts of said chlorinated ethylene polymer of a cross-linkable polyfunctional monomer selected from the group consisting of allyl acrylate, allyl methacrylate, diallyl adipate, diallyl amine, diallyl itaconate, diallyl maleate, diallyl phthalate, divinyl benzene, ethylene glycol diacrylate, ethylene glycol dimethacrylate, triallyl amine, triallyl phosphate and vinyl methacrylate, (3) between about 0.1 and 10 parts per 100 parts of said chlorinated ethylene polymer of a polybutadiene having a vinyl unsaturation of between about 20 and 25 percent and a molecular weight of about 2500, and (4) as a chemical curing agent for said chlorinated ethylene polymer a peroxide containing at least one unit of the structure

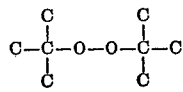

2. The composition of claim 1 wherein said ethylene polymer is polyethylene.
3. The composition of claim 2 wherein said cross-linkable difunctional monomer is ethylene glycol dimethacrylate.
4. A jacketing material for an insulated electrical conductor consisting of the cured product of claim 1.
5. A curable composition comprising (1) an essentially linear chlorinated polyethylene having a molecular weight of from about 20,000 to 200,000, a chlorine content of from about 25 to 50 percent, a relative crystallinity of less than about 10 percent, a tensile strength of greater than about 1000 p.s.i. and a 100 percent modulus of less than about 300 p.s.i., said chlorinated polyethylene being prepared by chlorination of an essentially linear polyethylene in aqueous suspension wherein said polyethylene is first chlorinated at a temperature below its agglomeration temperature for a period sufficient to provide a chlorine content of from about 2 to 23 percent chlorine based on the total weight of said polyethylene, followed by a sequential suspension chlorination of said polyethylene at a temperature above the agglomeration temperature but at least about 2° C. below the crystalline melting point of said polyethylene, (2) from about 0.1 to 10 parts per 100 parts of said chlorinated polyethylene of ethylene glycol dimethacrylate, (3) between about 0.1 and 10 parts per 100 parts of said chlorinated polyethylene of a polybutadiene having a vinyl unsaturation of between about 20 and 25 percent and a molecular weight of about 2500, and (4) as a chemical curing agent for said chlorinated polyethylene a peroxide containing at least one unit of the structure

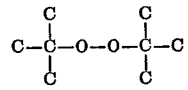

References Cited

UNITED STATES PATENTS

| 3,227,781 | 1/1966 | Klug et al. | 260—897 C |
| 3,291,863 | 12/1966 | Frey et al. | 260—897 C |
| 3,399,155 | 8/1968 | Baer et al. | 260—897 C |

JOSEPH L. SHOFER, Primary Examiner

A. HOLLER, Assistant Examiner

U.S. Cl. X.R.

260—879, 885, 886